June 25, 1968

C. F. LOGAN 3,389,559

FLUID RECOVERY SYSTEM AND METHOD

Filed May 17, 1965

INVENTOR.
Campbell F. Logan
BY
George H. Baldwin
ATTORNEY

United States Patent Office 3,389,559
Patented June 25, 1968

3,389,559
FLUID RECOVERY SYSTEM AND METHOD
Campbell F. Logan, 1127 Brookwood Road,
Jacksonville, Fla. 32207
Filed May 17, 1965, Ser. No. 456,263
11 Claims. (Cl. 61—1)

ABSTRACT OF THE DISCLOSURE

A method and apparatus for recovering a fluid, having a specific gravity lower than the specific gravity of water and immiscible therewith, which is leaking from a fracture in the flow line submerged in open water including the steps of locating the leak in the submerged flow line, centering with respect to the point where the fluid rises to the water surface a flexible air-impervious sheet on and just below the water surface for confining the fluid to a specific area on the water surface, floating the sheet adjacent the water surface to stabilize the sheet, weighting the sheet along its peripheral edge portion to maintain the edge portion a predetermined distance below the water surface, anchoring the sheet in a position generally vertically with respect to the leak, inflating the sheet with a gas between the sheet and the water surface to maintain the central portion of the sheet above the water surface, withdrawing the fluid confined between the sheet and the water surface, and storing the withdrawn fluid.

---

Figure 1:
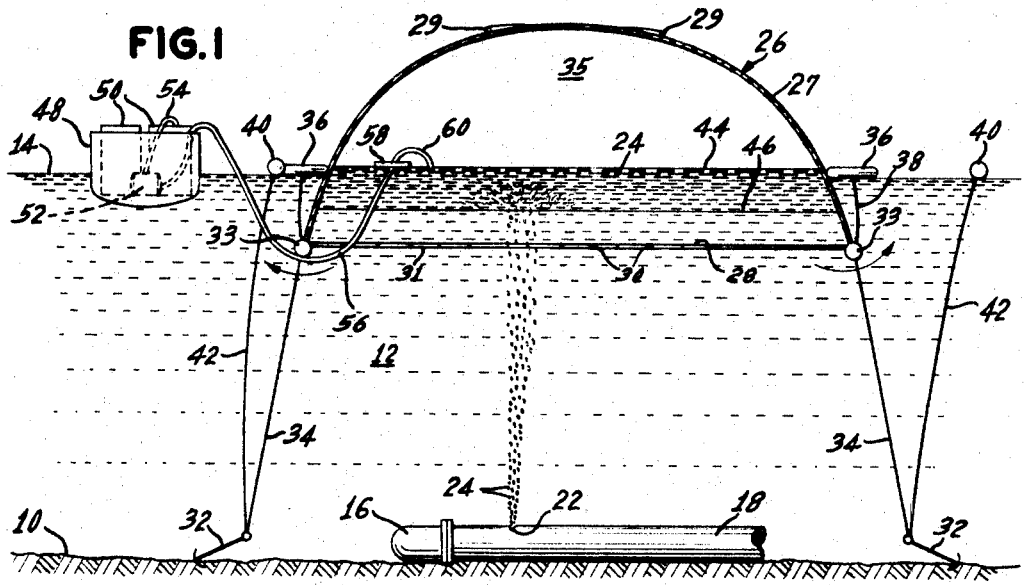

This invention relates to a fluid recovery method and system for use in open waters such as rivers, harbors, ports, lakes, and the like. More particularly, the invention is concerned with a method and system for recovering fluids, whose specific gravity is lower than that of water, which are escaping from flow lines submerged in open water.

A general object of the invention is to provide an improved method and system for recovering fluids.

Many times harbors, ports, rivers and lakes are understrewn with a maze of pipes, flow-lines and hoses which are used to carry a variety and number of raw materials and finished goods, usually petroleum products and oils of one sort or another. When in operation these flow-lines transport the products cross-country, or are used to load and unload fluids between a vessel and storage facilities on the shore. An additional use of such pipelines is to transport petroleum from off-shore producing oil wells to centrally located tank batteries on land or on nearby barges where the oil is stored awaiting further transportation or processing. Should a leak develop in one of these flow lines, pumping operations normally will be discontinued until the line can be repaired which may result in an extended time loss. If pumping is allowed to be continued contamination of the surrounding water is certain, and damage may occur to nearby vessels and shore installations. Also there will be danger of fire, especially if the fluid in the line is a petroleum product. Additionally, if a large quantity of the fluid is permitted to escape through the opening in the line it could result in quite a substantial economic loss. A particular object of the present invention is to provide an improved method and system which alleviates the aforementioned problems and permits the continued use and operation of a submerged flow line having a leak therein, with a minimum of hazard to safety, while providing for the retaining and recovery of the fluid, lighter than water, which is escaping from the flow line.

A specific object of this invention is to provide a method for retaining fluids, which are lighter than water, escaping from pipelines and hoses submerged in open water.

An additional specific object of the present invention is to provide a method for simultaneously retaining and recovering fluids, which are lighter than water, that have escaped from a flow line submerged in open water.

Another specific object of the subject invention is to provide a method for recovering an oil which is leaking from a hole in a flow line submerged in open water.

Further specific objects of this invention are to provide a system for accomplishing the above objects.

In general, these objects are attained in accordance with the present invention by providing a novel system and arrangement of equipment for recovering a fluid, which has a specific gravity less than the specific gravity of water and is immiscible therewith, which is escaping from a leak in a flow line submerged below a body of water, which system comprises retaining means generally in vertical working alignment with the leak for capturing the fluid leaking from the flow line. Such retaining means generally include a flexible air impervious sheet which has weights attached to its peripheral edge portion at three equally spaced points to position this sheet below the water surface, anchor means connected to the sheet and engageable with the bottom of the body of water to prevent lateral displacement of the sheet from the general vertical working alignment with the leak, and float means attached to the sheet at three equally spaced points along its peripheral edge portion to maintain this edge portion below the water surface a predetermined distance. The sheet additionally has a central portion which is maintained above the water surface by the use of gaseous pressure applied between the underside of the sheet and the water surface. Additionally, the system comprises a skimming means positioned below the sheet for withdrawal of the fluid confined by the sheet and a storage means for storing the withdrawn fluid. Also these objects are attained and the invention is practical by a process for recovering a fluid having a specific gravity lower than the specific gravity of water and immiscible therewith, which is leaking from a fracture in a flow line submerged in open water. This process comprises the steps of locating the leak in the submerged flow line, then centering with respect to the point where the fluid rises to the water surface a sheet on and just below the water surface for the purpose of confining the fluid to a specific area on the water surface. Next the sheet is floated adjacent the water surface to help in stabilizing it, and then weighted along its peripheral edge portion to maintain this edge portion a predetermined distance below the water surface. Once this is accomplished, the sheet is anchored in position generally vertically with respect to the leak and then inflated with a gas between the sheet and the water surface to maintain the central portion of the sheet above the water surface. Lastly, the fluid confined between the sheet and the water surface is withdrawn and stored.

Figure 2:
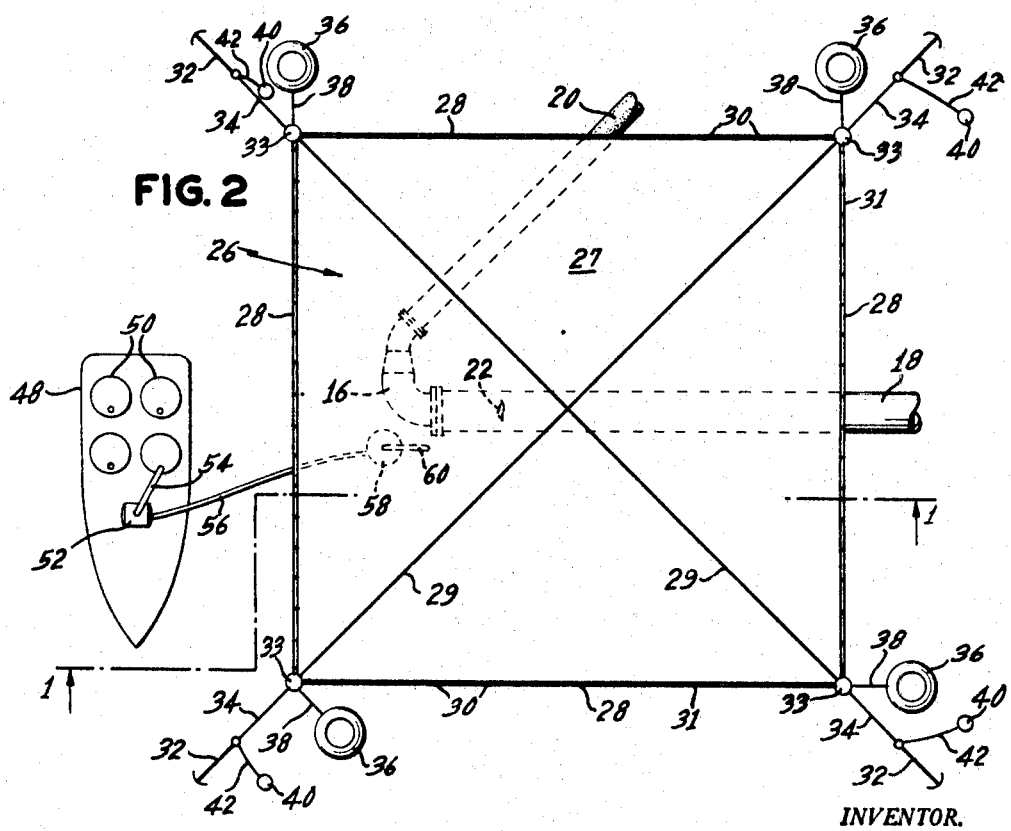

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

FIG. 1 is an elevational view partly in section taken along line 1—1 of FIG. 2, showing a preferred embodiment of the system of the invention in operation; and FIG. 2 is a plan view of the system in accord with the invention.

With particular reference to the drawing now, the floor or bottom of the lake, harbor, bay, etc., is generally indicated at reference numeral 10. Supported by bottom 10 is a body of water designated at 12 and having a water surface 14. The depth of water body 12, in order for the method and system of this invention to operate successfully, may vary from several feet up to a hundred feet, and in some instances well over one hundred feet in depth.

Lying on bottom 10 is a submerged flow line 16 which includes a steel pipeline 18 and rubber hose 20 of smaller diameter used in loading a waiting vessel (not shown). Flow line 16 may be of any desirable diameter and length and may be constructed of any of the well known materials such as steel, iron, plastic, rubber, clay tile, or cement. A hole having developed in flow line 16 either by the action of nature or a careless act of man is depicted at 22. Leaking from flow line 16 through hole 22 is a fluid 24 which is being transported by the flow line. For the purposes of this invention, fluid 24 may be any liquid which is transportable by use of a flow line, has a specific gravity lower than the specific gravity of water and is generally immiscible with water. Some of the most commonly used fluids would be petroleum and petroleum products of one sort or another, although there are many other lighter than water liquids that could be employed.

Generally designated at 26 is a retainer for entrapping the escaping fluids comprising a continuous sheet 27, terminating in peripheral edge portions 28, which sheet is impervious to air and which may be composed of any suitable material, such as rubber, polyethylene, suitably coated or impregnated canvas, or the like. As will be apparent hereinafter one function of sheet 27 is to provide a chamber in which air is trapped. The sheet is continuous throughout its dimensions in that there are no apertures and holes in the sheet through which air may escape when being employed as contemplated in accord with the invention. In the embodiment shown, sheet 27 is further reinforced by employing lines 29 connected to the sheet and running between opposite corners of the sheet. The shape of the sheet may take most any form desired, in the case of the illustrated embodiment the sheet 27 is in the form of a square, but it may be round if desired. The size of sheet 27 may vary over a wide range of dimensions, the size being determined by the area of open water desired to be covered, which in turn may depend on the size and extent of the fluid leak in the flow line. The size of sheet 27, however, should be somewhat larger than the specific area of open water desired to be covered so as to enable the sheet, when employed in the manner contemplated by the invention with its peripheral edge portions 28 being secured by anchors well below water surface 14, to bulge upwardly under the influence of a gas which is inserted beneath the sheet. Attached to sheet 27 along its peripheral edge portions 28, and in a suitably spaced manner are hook snaps 30 by which the sheet is attached to a steel cable 31 running along the periphery of retainer 26. At the corners of retainer 26, and attached thereto, are hooks or attaching rings 33 employed for the purpose of connecting the retainer to anchors, floats, buoys and the like used in the system of this invention.

The peripheral edge of retainer 26 is secured below the water surface 14 by use of anchors 32 attached by anchor lines 34 to cable 31 at the corners of the retainer, thus providing an air-tight compartment 35, having a fluid seal, between the water and sheet 27. There are additionally floats or buoys 36 attached to cable 31 at the corners of the retainer by the use of tie lines 38 to aid in stabilizing retainer 26 during periods when the body of water 12 is choppy or rough. These floats or buoys 36 and their tie lines 38 are additionally used when putting the system of this invention into operation. That is to say that before recovery operations have begun, floats 36 with tie lines 38 support and suspend steel cable 31 at the desired depth in water body 12 while retainer 26 is anchored in position and continuous sheet 27 of the retainer is inflated. Attached to anchors 32 are buoys 40 connected by buoy ties 42 to provide for easy detection of the anchors when retainer 26 is to be moved to another location or taken out of service entirely.

In FIG. 1 reference numeral 44 generally designates the surface or level of the oil or other lighter than water fluid 24 leaking from flow line 16 once the system of this invention has been put into operation; while 46 represents the oil-water interface or water level after fluid 24 has displaced some of the water out of the bottom of retainer 26.

The system of the invention additionally comprises means for recovering or recapturing and storing the fluid or oil 24 which has been entrapped and retained under retainer 26. Such means include a small boat or barge 48 having suitable storage means 50 for storing the oil or fluid 24 recovered from under retainer 26, which results from the leakage in flow line 16. The storage means 50 may be in any suitable form, such as large oil drums, or containers built into the hold of the boat, or the like. Also contained in boat 48 is a small portable pump 52 having both discharge hose 54 and intake hose 56 connected thereto, such that the oil or other fluid 24 entrapped under retainer 26 may be pumped therefrom and stored in storage means 50. The recovery means is completed by a float 58 attached to the free end of pump intake hose 56, which in turn supports a skimmer 60 on the oil surface 44, so as to insure that the fluid pumped through pump 52 is taken from oil surface 44. Skimmer hose 56 may also be used to inflate or fill sheet 27 of retainer 26 with air or other like gas before recovery operations are begun. This may be attained by disconnecting intake hose 56 from pump 52 and attaching the same to an air pump, compressor, or a cylinder of compressed air or another suitable source of gas supply.

The method and system of this invention may be employed once it is determined that there is a break in a flow line submerged in open water and the leak therein has been located. The system of the invention is then transported to the area of the leak and centrally located over the hole in the flow line; or should the water current or flow be such as to cause the oil to rise to the surface other than directly over the leak, then the system should be centered at the point where the oil or other fluid is actually coming to the water surface. To put the system into operation, after it has been located over the leak, cable 31 is first suspended in the body of water 12 at the desired depth, which depth is usually 3 to 4 feet but may be more, and supported there by floats 36 and tie lines 38 connecting the floats to the cable. Next anchors 32 which are attached to cable 31 at the corners of retainer 26 are set to hold the retainer in place once recovery operation are begun. After anchoring, sheet 27 of the retainer is inflated to form a large generally dome shaped canopy by inserting compressed air or other suitable gas through skimmer hose 56. Once this is accomplished recovery operations may proceed by making use of pump 52 and skimmer 60, such that the oil which is floating on the water surface and entrapped under retainer 26 is pumped into and retained in storage means 50.

It is readily apparent from the above description that applicant has disclosed an economical, relatively simple, and easily transportable system and method for recovering oil and other lighter than water fluids leaking from submerged flow lines, while at the same time allowing for the continued use and operation of the ruptured flow line, whereby a substantial savings is possible in both time and money.

While only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. A method of recovering a fluid, having a specific gravity lower than that of water and immiscible therewith, which fluid is escaping to the water surface comprising the steps of locating the leaking fluid at the water surface, locating a sheet for confining the escaping fluid generally vertically above the leaking fluid and on and just below the water surface, inflating the sheet between the water and sheet, and withdrawing and storing the fluid which has been so confined.

2. A method for recovering a fluid, having a specific gravity lower than the specific gravity of water and immiscible therewith, which is leaking from a fracture in a container submerged in water comprising the steps of centering with respect to the point where the fluid rises to the water surface a sheet on and just below the water surface for confining the fluid to a specific area on the water surface, anchoring the peripheral portion of the sheet below the surface of the water a predetermined distance, inflating with a gas between the sheet and the water surface to maintain the central portion of the sheet above the water surface, withdrawing the fluid confined between the sheet and the water surface, and storing the withdrawn fluid.

3. A method for recovering an oil or the like which is leaking from a submerged flow line comprising the steps of centering with respect to the point where the oil rises to the water surface a flexible retainer means on and just below the water surface for confining the oil to a specific area on the surface of the water, inflating the flexible retainer means between the retainer means and the water surface floating the retainer means to stabilize same adjacent the water surface, weighting the retainer means along its peripheral portion to position said portion a predetermined distance below the water surface, anchoring the retainer means in position generally vertically with respect to the leak, withdrawing the oil confined on the water surface by the retainer means and storing the withdrawn oil.

4. A method for recovering a fluid, having a specific gravity lower than the specific gravity of water and immiscible therewith, which is leaking from a fracture in a flow line submerged in open water comprising the steps of locating the leak in the submerged flow line, centering with respect to the point where the fluid rises to the water surface a sheet on and just below the water surface for confining the fluid to a specific area on the water surface, floating the sheet adjacent the water surface to stabilize said sheet, weighting the sheet along its peripheral edge portion to maintain said edge portion a predetermined distance below the water surface, anchoring the sheet in position generally vertically with respect to the leak, inflating with a gas between the sheet and the water surface to maintain the central portion of the sheet above the water surface, withdrawing the fluid confined between the sheet and the water surface, and storing the withdrawn fluid.

5. A system for recovering a fluid leaking from a submerged flow line, which has a specific gravity less than the specific gravity of water and is immiscible therewith comprising a retainer having an air impervious sheet, weight means attached to the peripheral edge portions of said sheet, buoyancy means for suspending said weight means a predetermined distance below the water surface, anchoring means securing said sheet in a desired position generally over the submerged flow line leak, and skimmer means for withdrawing and storing the fluid confined beneath said sheet.

6. A system for recovering an oil or the like which is leaking to the water surface comprising a retainer having a flexible air impervious sheet, a weighted cable attached to the peripheral edge portion of said sheet, float means connected to said cable by lines to support and suspend said cable a predetermined distance below the water surface, anchor means attached to said cable by lines for securing said sheet in a desired position generally vertical above the leaking oil, means for maintaining the central portion of said sheet above the water surface, a skimmer below said sheet for withdrawing the oil confined by said sheet, and storage means for storing the withdrawn oil.

7. A system for recovering oil or the like which escapes from a leak in a flow line submerged below a body of water comprising retaining means positionable in the water adjacent its surface and generally in working vertical alignment with the leak for capturing the oil leaking from the flow line, said retaining means including a flexible air impervious sheet, weight means attached to said sheet along its peripheral edge portion to position same below the water surface, anchoring means attached to said sheet and engageable with the bottom of the body of water to prevent lateral displacement of said sheet from the general vertical working alignment with the leak, buoyancy means attached to said sheet adjacent its peripheral edge portion to maintain said peripheral edge portion below the water surface a predetermined distance, said sheet having a central portion above the water surface and maintained thereabove by gaseous pressure therebeneath, a skimming means positioned below the sheet for withdrawal of the oil confined by said sheet and storage means for storing the withdrawn oil.

8. In the system as defined in claim 7 wherein said skimming means includes a surface float freely disposed within the enclosure beneath said sheet and floatable adjacent the surface of the oil confined by said sheet.

9. A system for recovering a fluid, which has a specific gravity less than the specific gravity of water and is immiscible therewith, which escapes from a leak in a flow line submerged below a body of water comprising retaining means positionable in the water adjacent its surface and generally in vertical working alignment with the leak for capturing the fluid leaking from the flow line, said retaining means including a flexible air impervious sheet, weight means attached to said sheet at three equally spaced points along its peripheral edge portion to position same below the water surface, anchoring means attached to said sheet and engageable with the bottom of the body of water to prevent lateral displacement of said sheet from the general vertical working alignment with the leak, buoyancy means attached to said sheet at three equally spaced points along its peripheral edge portion to maintain said peripheral edge portion below the water surface a predetermined distance, said sheet having a central portion above the water surface and maintained thereabove by gaseous pressure therebeneath, a skimming means positioned below the sheet for withdrawal of the fluid confined by said sheet and storage means for storing the withdrawn fluid.

10. In the system as defined in claim 9 wherein said skimming means includes a surface float freely disposed within the enclosure beneath said sheet and floatable adjacent the surface of the fluid confined by said sheet.

11. A system for recovering an oil or the like which is leaking from a flow line submerged in open water comprising a retainer having a flexible air impervious sheet, weight means attached to the peripheral edge portion of said sheet at three equally spaced points, float means connected to three equally spaced points of the peripheral edge portion of said sheet to support and suspend the peripheral edge portion of said sheet a predetermined distance below the water surface, anchor means attached to the peripheral edge portion of said sheet for securing said sheet in a desired position in general vertical alignment with the leak from the flow line, a skimmer below said sheet for withdrawing the oil confined by said sheet, and storage means for storing the withdrawn oil.

References Cited

UNITED STATES PATENTS

| 2,132,800 | 10/1938 | Payton | 299—9 |
|---|---|---|---|
| 2,211,958 | 8/1940 | Mahaffey | 137—236 X |
| 2,240,567 | 5/1941 | Meacham et al. | 61—1 |
| 2,330,508 | 9/1943 | McColl | 210—242 |
| 2,783,970 | 3/1957 | Gillespie | 166—.5 X |
| 3,230,967 | 1/1966 | Castro | 137—236 |
| 3,289,415 | 12/1966 | Merrill | 61—1 |

FOREIGN PATENTS

| 184,164 | 6/1963 | Sweden. |
|---|---|---|

EARL J. WITMER, *Primary Examiner.*